United States Patent
Agan et al.

(10) Patent No.: US 8,085,342 B2
(45) Date of Patent: Dec. 27, 2011

(54) HIGHLY MINIATURIZED, BATTERY OPERATED, DIGITAL WIRELESS CAMERA USING PROGRAMMABLE SINGLE CHIP ACTIVE PIXEL SENSOR (APS) DIGITAL CAMERA CHIP

(75) Inventors: Martin J. Agan, Pasadena, CA (US);
Eric R. Fossum, La Crescenta, CA (US);
Bob H. Nixon, Burbank, CA (US); Brita H. Olson, Pasadena, CA (US);
Bedabrata Pain, Los Angeles, CA (US);
Chris Pasqualino, Glendora, CA (US);
Ed H. Satorius, Glendale, CA (US);
Tim J. Shaw, Pasadena, CA (US); Gary L. Stevens, Glendora, CA (US)

(73) Assignee: California Institute of Technology, Pasadena, CA (US)

( * ) Notice: Subject to any disclaimer, the term of this patent is extended or adjusted under 35 U.S.C. 154(b) by 297 days.

(21) Appl. No.: 11/957,394

(22) Filed: Dec. 14, 2007

(65) Prior Publication Data
US 2009/0122169 A1    May 14, 2009

Related U.S. Application Data

(63) Continuation of application No. 09/218,958, filed on Dec. 22, 1998, now abandoned.

(51) Int. Cl.
*H04N 5/225* (2006.01)
*H04N 5/232* (2006.01)

(52) U.S. Cl. .................................. 348/372; 348/211.2

(58) Field of Classification Search ............. 348/211.99, 348/211.1, 211.2, 211.5, 372
See application file for complete search history.

(56) References Cited

U.S. PATENT DOCUMENTS

| | | | |
|---|---|---|---|
| 3,686,434 A | 8/1972 | Lemelson | |
| 5,128,755 A | 7/1992 | Fancher | |
| 5,179,446 A | 1/1993 | Hong | |
| 5,255,046 A | 10/1993 | Kawasaki et al. | |
| 5,325,449 A | * 6/1994 | Burt et al. | 382/240 |
| 5,471,515 A | 11/1995 | Fossum et al. | |
| 5,479,206 A | 12/1995 | Ueno et al. | |
| 5,541,654 A | 7/1996 | Roberts | |
| 5,652,619 A | 7/1997 | Nakamura et al. | |
| 5,838,250 A | 11/1998 | Maekawa | |
| 5,841,126 A | 11/1998 | Fossum et al. | |
| 6,002,436 A | 12/1999 | Anderson | |
| 6,034,722 A | 3/2000 | Viney et al. | |
| 6,115,066 A | 9/2000 | Gowda et al. | |

(Continued)

OTHER PUBLICATIONS

Kemeny, S.E., et al., "Multiresolution Image Sensor," *IEEE Transactions on Circuits and Systems for Video Technology*, 7(4):575-583, Aug. 1997.

*Primary Examiner* — Kelly L Jerabek
(74) *Attorney, Agent, or Firm* — Perkins Coie LLP (57) ABSTRACT

A miniaturized camera which is programmable and provides low power consumption. An active pixel image sensor used in the highly miniaturized camera provides improved imaging functionality as well as reduced power consumption, extending the possible life time of the camera system. The spread spectrum nature of transmission and reception improves data integrity as well as data security. The ability of the highly miniaturized wireless camera to receive commands as well as transmit image data provides improved functionality and a variable rate of power consumption to be set according to the application and needs of the situation.

18 Claims, 10 Drawing Sheets

U.S. PATENT DOCUMENTS

| | | |
|---|---|---|
| 6,223,190 B1 * | 4/2001 | Aihara et al. .................. 715/234 |
| 6,248,991 B1 | 6/2001 | Chen et al. |
| 6,256,060 B1 | 7/2001 | Wakui |
| 6,403,963 B1 | 6/2002 | Nikzad et al. |
| 6,567,122 B1 * | 5/2003 | Anderson et al. .......... 348/211.3 |
| 6,606,122 B1 | 8/2003 | Shaw et al. |
| 2002/0145669 A1 | 10/2002 | Umeda et al. |

* cited by examiner

HIGHLY MINIATURIZED, BATTERY OPERATED, DIGITAL WIRELESS CAMERA USING PROGRAMMABLE SINGLE CHIP ACTIVE PIXEL SENSOR (APS) DIGITAL CAMERA CHIP

CROSS-REFERENCE TO RELATED APPLICATIONS

This application is a continuation application of and claims priority to U.S. application Ser. No. 09/218,958, filed on Dec. 22, 1998 now abandoned. The disclosure of the prior applications are considered part of (and are incorporated by reference in) the disclosure of this application.

FEDERALLY SPONSORED RESEARCH OR DEVELOPMENT

The U.S. government may have certain rights to this invention under contract No. NAS 7-1260 from the National Aeronautics and Space Administration and the Department of Defense.

TECHNICAL FIELD

The invention relates to a highly miniaturized camera, and more specifically to a highly miniaturized, low power, digital wireless camera.

BACKGROUND INFORMATION

A great interest exists in highly miniaturized low power wireless imagers. In the past, highly miniaturized cameras have been connected to a base station by wires. However, such wires limit the operable range within which a miniaturized camera can be used.

As a result, wireless, highly miniaturized cameras have been developed. The elimination of wires allows for a truly independent miniaturized camera. Potential military uses include unmanned air vehicles ("UAVs") and the twenty-first century land warrior ("21 CLW"). Additional applications include surveillance and covert operations, border monitoring, drug interdiction, National Aeronautics and Space Administration ("NASA") extravehicular activities ("EVA"), and Drug Enforcement Agency ("DEA") or Federal Bureau of Investigation ("FBI") uses. In addition, the independent and miniaturized nature of such a camera allows for convenient placement of the camera, such as through an air drop. Accordingly, a highly miniaturized wireless camera has tremendous market potential.

While a number of battery powered wireless sensors are commercially available, typically such cameras rely on charge coupled device ("CCD") image sensor systems. CCD sensors require a number of support chips and high voltages for proper operation. As a result, CCD image sensors generally consume much power (1-2 watts) and are bulky.

In addition, typical conventional wireless cameras only operate in a single operating mode. Thus, the power consumption of such cameras is typically at a constant high rate. Wireless cameras must have their own power source such as a battery. Given the high power consumption of CCD systems, wireless cameras using CCD image sensors require a physically large power source, increasing the camera's overall size. If a smaller power source is used, the operable lifespan of the system is shortened. Thus, these CCD image sensor systems are not well suited for power and space constrained applications.

Furthermore, conventional wireless cameras typically have limited range, no ability to receive and perform commands, and do not have multiple access capabilities.

Accordingly, the inventors have determined that it would be desirable to provide a highly miniaturized wireless camera that provides programmability and low power consumption.

SUMMARY OF THE INVENTION

The system provides a highly miniaturized wireless digital camera which has low power consumption and is programmable. In the preferred embodiment, the image sensor of the camera is based on a CMOS active pixel sensor ("APS") technology. All functionality required to operate the imager and digitize data is merged on a single APS chip. No support chips are required. This configuration results in low power consumption and long lifespan.

The disclosed embodiment provides additional advantages. The preferred embodiment has a bi-directional communications link. The camera switches between multiple modes to efficiently allocate power among its internal components responsive to commands. This communications link also allows the wireless camera to receive commands to perform different imaging operations (such as altering the exposure time arbitrary windowings and sub-samplings). Thus, the preferred embodiment is a programmable camera. The preferred embodiment utilizes spread spectrum to reduce the probability of interception of data transmissions in reconnaissance applications. Communication protocols allow a base station to support up to 255 stations concurrently. The present invention has a one kilometer range.

DETAILED DESCRIPTION

In a preferred embodiment, the camera includes an active pixel sensor ("APS") image sensor of the type described in U.S. Pat. No. 5,471,515 to Fossum, et al. or U.S. Pat. No. 5,841,126 to Fossum, et al. The APS uses a single power supply of approximately five volts and consumes approximately 20 mW of power. This power consumption is approximately 100 times less than a conventional CCD image sensor. This reduced power consumption extends the system battery lifetime.

The preferred image sensor system is highly miniaturized; all support electronics, including analog to digital converters are included on the imager chip. The camera has a complete serial digital interface which supports half duplex protocols. No support chips are needed, including those for command and data buffering. Additionally, the sensor can be programmed to support a number of imaging modes. These include one chip data reduction operation such as windowing and sub-sampling which can be employed to further reduce transmit power.

By leveraging off of the unique capabilities of the APS and integrating it with a lower-powered digital communication system for a command link and an image link, a digital wireless camera is provided that is more capable and flexible than conventional analog wireless cameras. The command link and its associated protocol allow the camera to be commanded to ultra low power standby mode, receive mode, or full transmit mode. This command link allows the wireless camera to be operated in an intelligent and efficient manner so as to minimize power consumption and extend battery life. For example, the camera can be commanded to lower frame rates, sub-sample an image, or go into sleep mode depending on the application or need. Conventional analog wireless cameras have no command link and thus, once they are turned on they will operate at maximum power consumption until the power source has expired. The details of these operations are described in co-pending U.S. patent application Ser. No. 09/162,918, assigned to the assignee of the present disclosure. By contrast, a camera according to the preferred embodiment operates for extended periods of time.

Figure 1A:
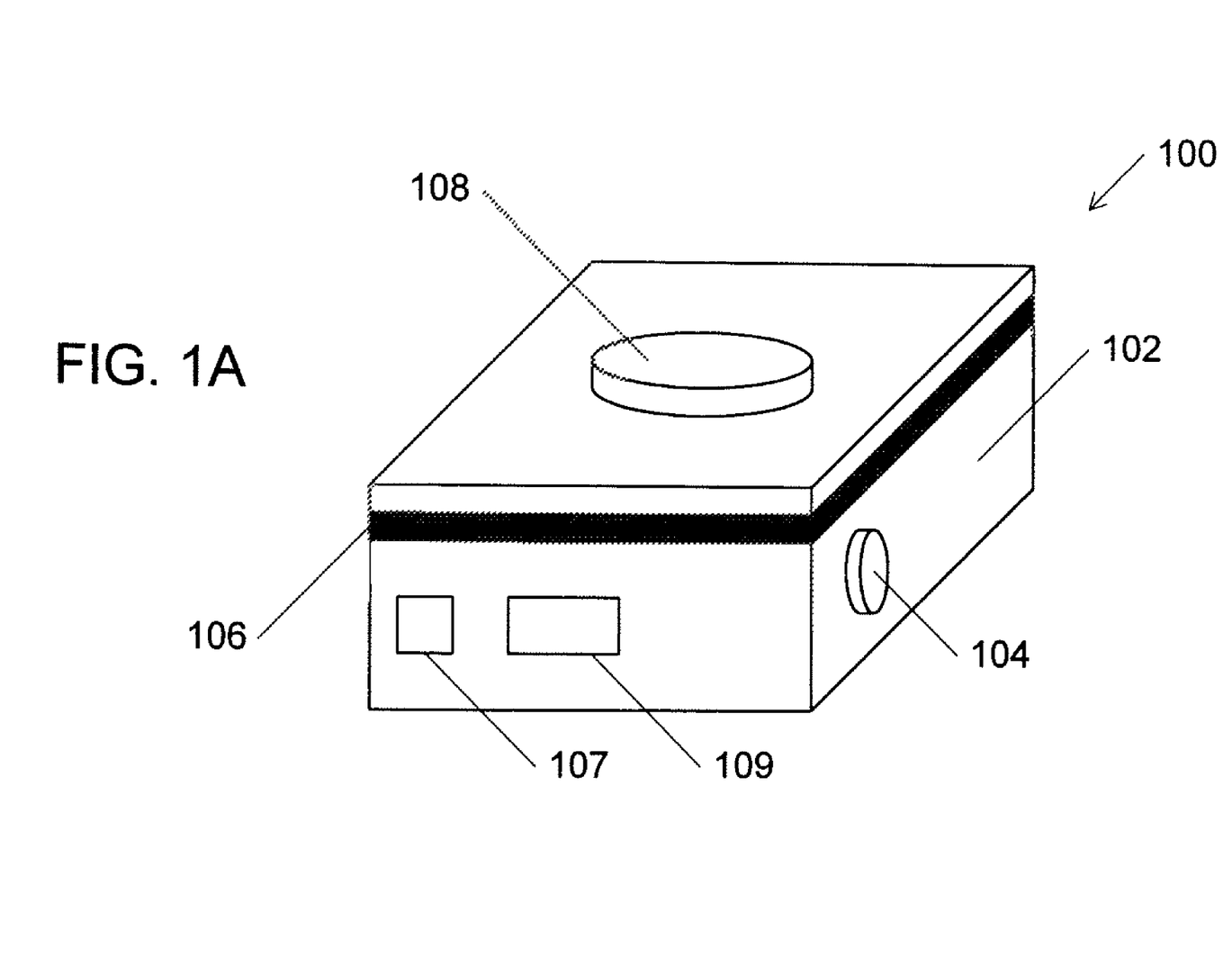
FIG. 1A is a perspective view of a camera according to a preferred embodiment.

FIG. 1A shows a perspective view of the packaging for one embodiment of a highly miniaturized camera 100. The exterior of the camera 100 is formed from a metallic case 102. A small lens 104 is located on one side of the camera 100. A receiving antenna 106 is inserted into the case 102 of the camera 100 and passes around the exterior of the case 102. The receiving antenna 106 traces a line across an upper edge of each side of the camera 100. The receiving antenna 106 is preferably a 418 megahertz antenna.

A transmitting antenna 108 is positioned on the upper surface of the camera 100. The transmitting antenna 108 is preferably a 2.4216 GHz disc-type antenna.

The camera 100 can also include a power switch 107 for turning the camera 100 on and off and a programming interface 109 for supplying data to and receiving data from the camera 100. As described herein, the programming interface is totally serial and digital.

Figure 1B:
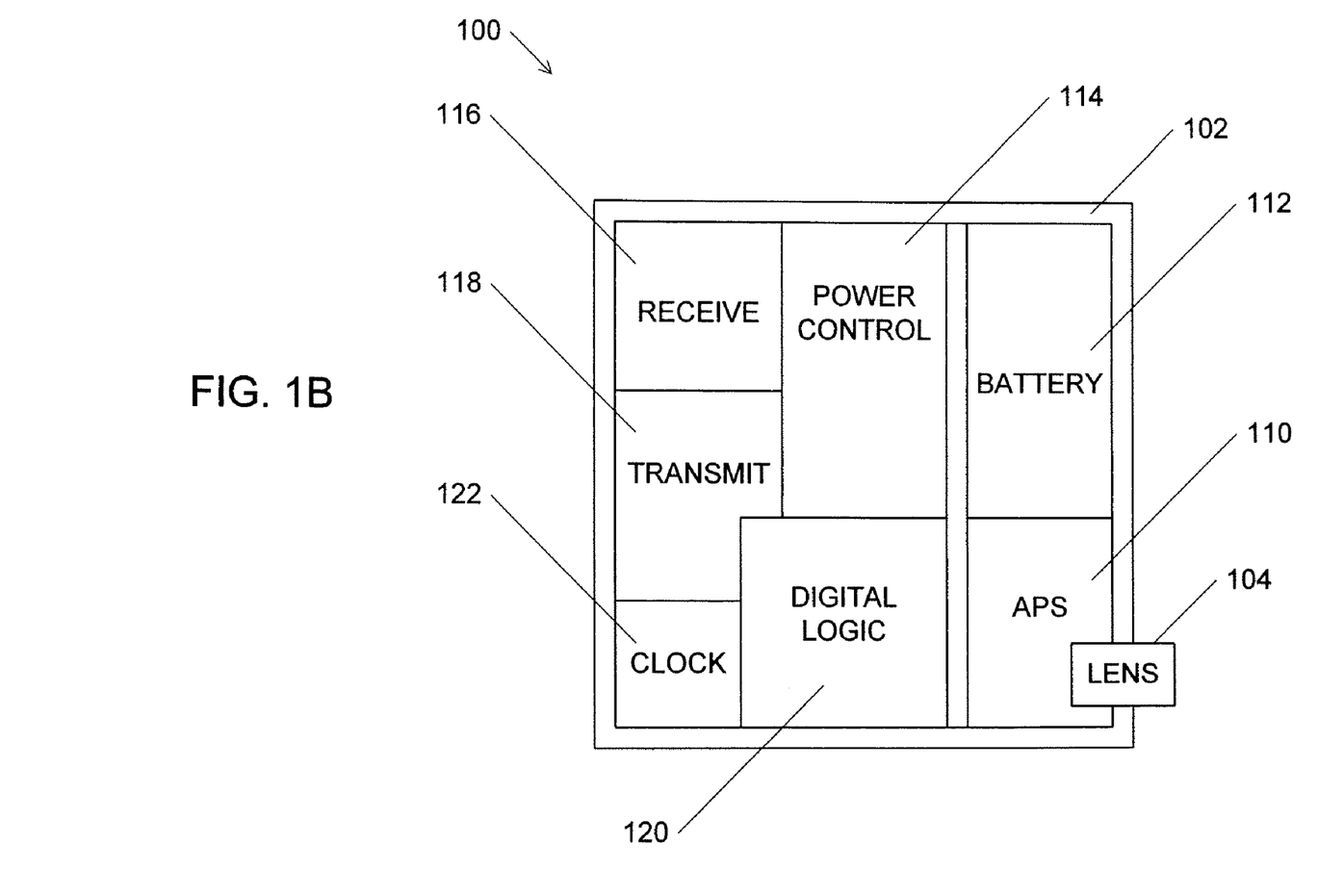
FIG. 1B is a block diagram of a camera according to a preferred embodiment.

FIG. 1B shows a block diagram of the positioning of components in the camera 100. The positioning of components in FIG. 1B is a preferred configuration, but alternative configurations are within the scope of the invention. An APS image sensor 110 is located next to the lens 104 so that incoming light is focused on the APS. A battery 112 powers the APS 110 and other elements. The camera 100 also comprises internal components including: power control components 114, receiving components 116, transmitting components 118, digital logic components 120, and clock components 122.

Figure 1C:
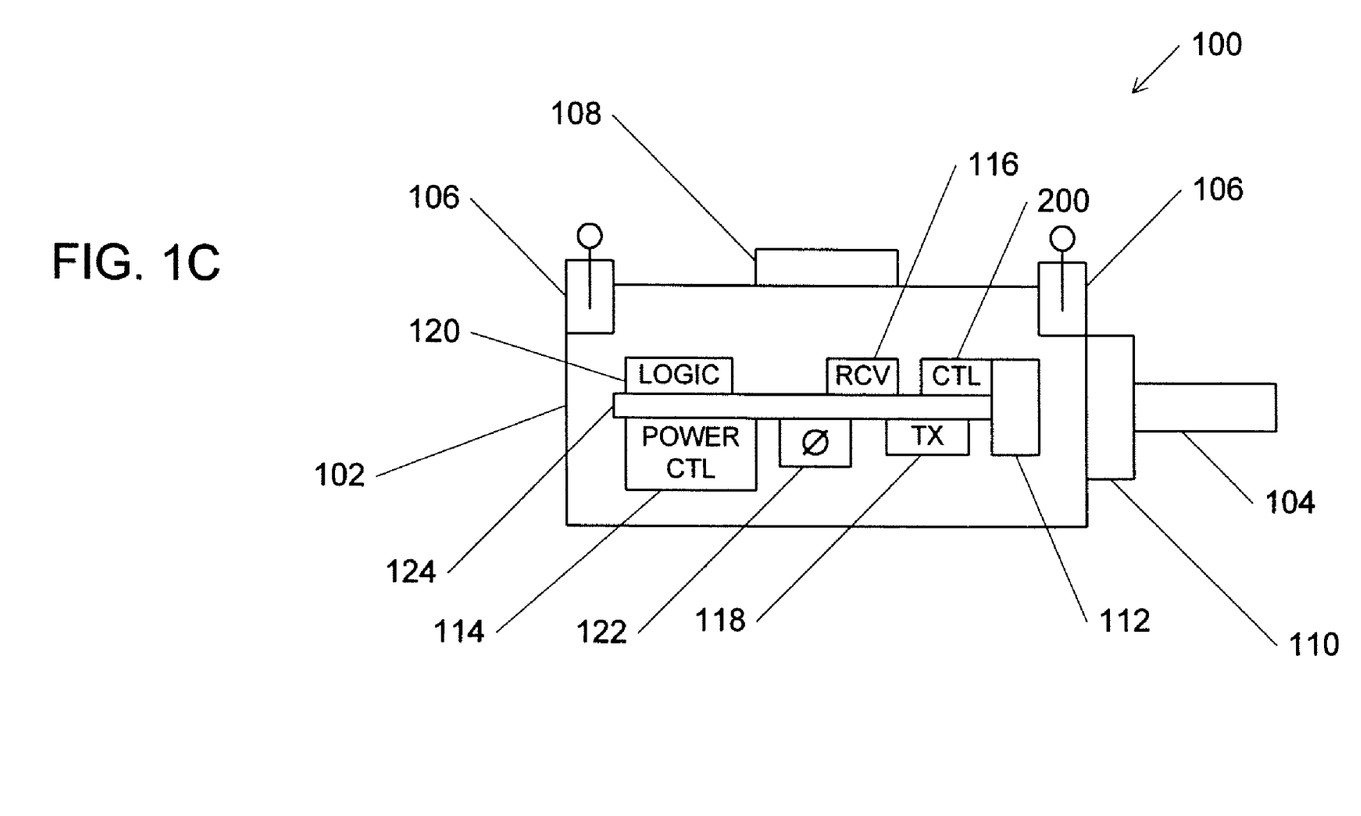
FIG. 1C shows a configuration of components in a preferred embodiment.

FIG. 1C shows a cross-section of the packaging of an embodiment of the camera 100. As in FIG. 1B, the positioning of components in FIG. 1C is a preferred configuration, but alternative configurations are within the scope of the invention. The receiving 106 antenna protrudes from the case 102. The internal components, 114, 116, 118, 120, and 122, are located on a main electronic board 124. The APS 110 is positioned between the lens 104 and the case 102 and is connected to the main electronic board 124. A battery 112 is connected to the board 124 as well.

Figure 1D:
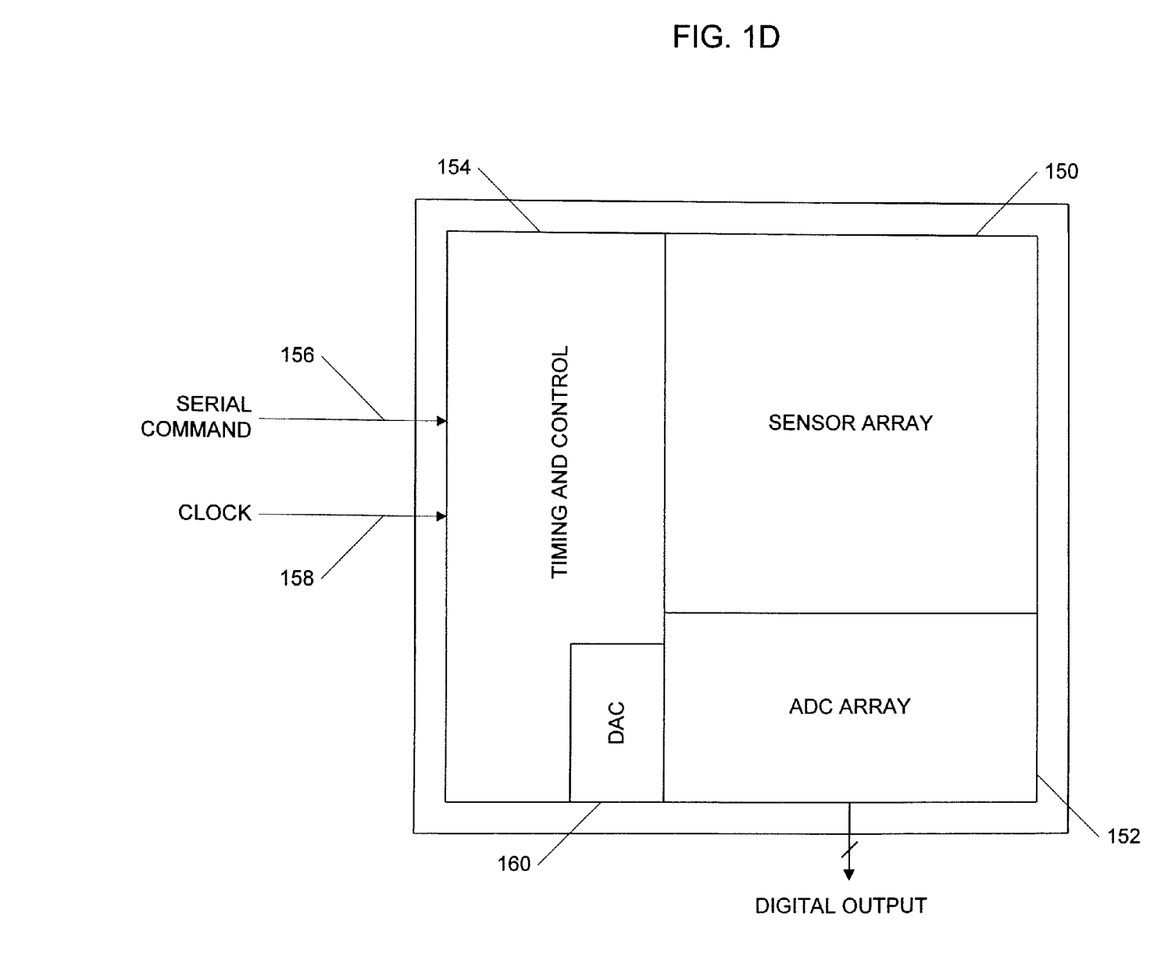
FIG. 1D shows a physical configuration of components in a preferred embodiment.

The surface of the chip is physically laid out as shown in FIG. 1D. The chip physically includes a sensor array 150, which are preferably active pixel sensors of the type described in U.S. Pat. No. 5,471,515. The arrays are connected to an analog-to-digital converter (ADC array 152) which produces a digital output indicative of the pixels. The analog-to-digital converters are column parallel with 10 bits of resolution and on-chip auto zeroing.

The timing and control portion 154 receives a serial command 156 and also receives a clock 158. The chip substrate also includes D-to-A converters and support circuitry 160.

As described below with reference to FIGS. 3 and 4A-B, the system operates with a read pointer and an integrate pointer. The time between the read pointer and the integrate pointer is called the integration time. The serial output from the column decoder follows the timing diagram shown in FIG. 4A. Each row is sampled for 22 microseconds, and the A-to-D conversion lasts for 12 microseconds. Each output takes a microsecond, so the entire 256 rows takes about 256 microseconds. Hence, the serial output outputs about 0.9 megapixels per second.

Figure 2:
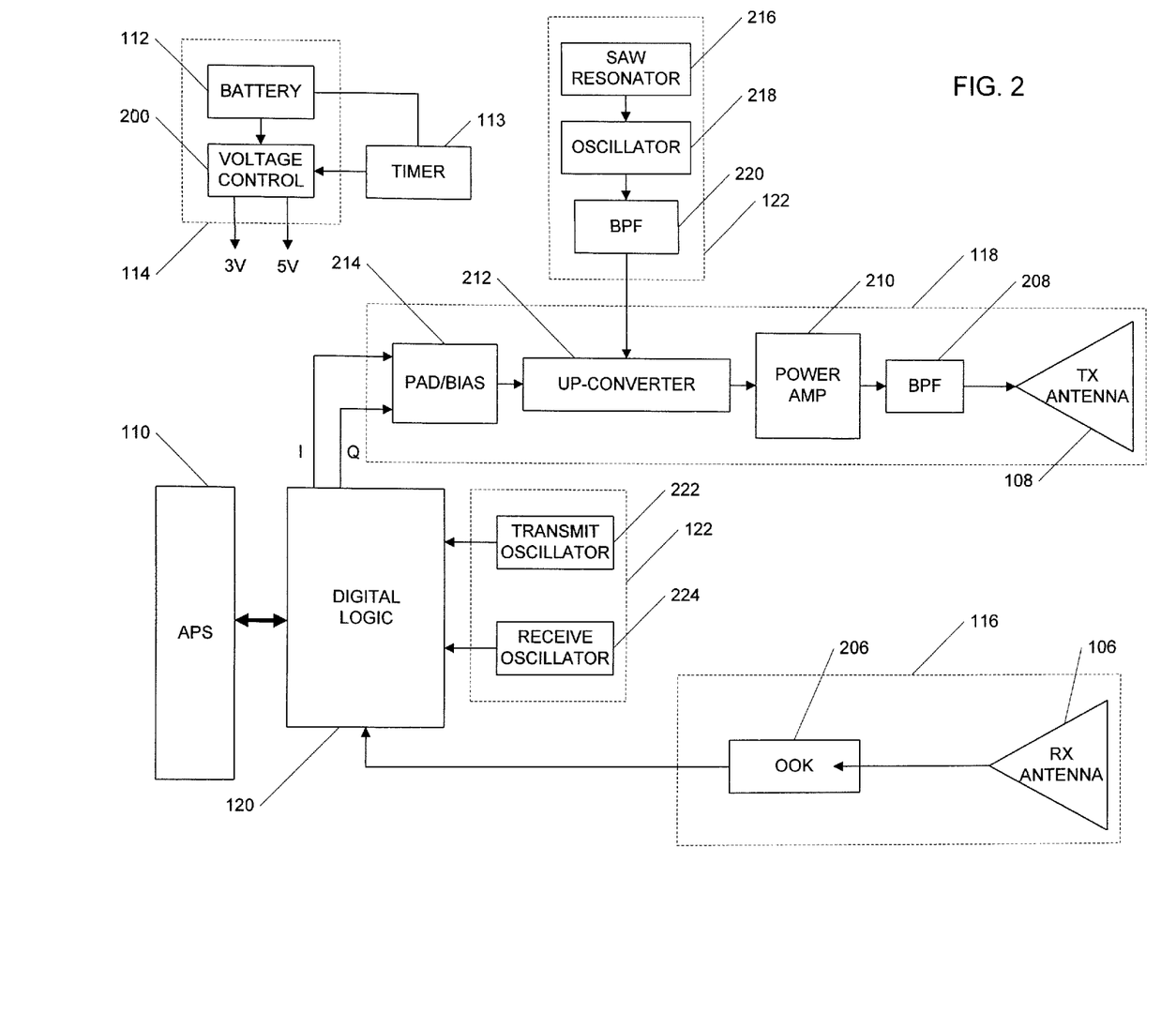
FIG. 2 is a block diagram of the components in a camera according to a preferred embodiment.

FIG. 2 shows an electrical block diagram of the camera 100. The power control components 114 produce the power to drive the system and comprise a voltage regulator and control circuit 200 which is connected to the battery 112. The voltage regulator and control circuit 200 produces regulated +5 V for use in transmit and +3 V for use in receive. A timer 113 produces periodic pulses for use during sleep mode—to periodically determine if any wake-up conditions exist. In standby mode, power is not supplied to the internal components of the camera 100, except for the clock components 122.

The receiving components 116 include antenna 106 and an on-off key ("OOK") receiver 206, e.g., a GaAs FET LNA model MGF-1402. A 418 megahertz signal is received by the receiving antenna 106 and is passed to the OOK receiver 206. The signal is transferred from the OOK receiver 206 to the digital logic components 120, described below.

The transmitting components 118 can use a transmission antenna 108, a band pass filter ("BPF") 208, a 100 mW power amplifier 210, e.g., an RFM2128, an up-converter 212, and pad/bias circuits 214.

The digital logic components 120 described below generate baseband in-phase ("I") and baseband quadrature ("Q") signals. These are passed to the pad/bias circuits 214 which impedance-match and level-adjust the signal and pass that signal to the up-converter 212. The up-converter 212 transforms the information in the signal to RF preferably using a 2.5 GHz quadrature conversion and passes that transformed signal to the power amplifier 210. The power amplifier 210 increases the level of the signal with a gain of approximately 25 dB and then passes the signal to the BPF 208. The BPF 208 filters the signal to a bandwidth of approximately 90 megahertz and then passes the signal to the transmission antenna 108 which transmits a 2.4216 GHz signal.

The digital logic components 120 include circuits for performing different functions depending upon the camera's mode of operation. In transmit mode, circuits for transmission spreading, convolutional coding, transmission differential encoding, and generating a training sequence are used. In receive mode, circuits for receive clock recovery, Manchester decoding, and UW detection are used. In standby mode, a timer is used. This can be embodied, for example, using a digital signal processor, or "DSP."

The digital logic components 120 receive signals from the APS 110 as well as from the receiving components 116. The APS 110 supplies transmission data as well as a power down signal to the digital logic components 120. The digital logic components 120 also send signals to the APS 110 and to the transmitting components 118. The digital logic components 120 supply received data, a received bit clock signal, an enable signal to the APS 110, and a transmission bit clock. As described above, the digital logic components 120 convolutionally encodes the data to supply a baseband I and baseband Q signal to the pad/bias circuits 214 of the transmitting components 118. In transmission mode, the digital logic components 120 supply a transmission bit clock to the APS 110. This device also includes sleep timer logic that operates in the sleep mode.

Various timers, oscillators, and clock circuitry are located throughout the internal hardware of the camera 100. The clock components 122 used by the transmitting components 118 include an surface acoustic wave ("SAW") resonator 216, an oscillator 218 and a band pass filter ("BPF") 220. The SAW resonator 216 is preferably a 407.35 megahertz resonator. The oscillator 218 has a transistor and network. The BPF 220 is preferably a times six harmonic filter.

Clock components 122 are also connected to the digital logic components 120. The digital logic components 120 use a transmission oscillator 222 and a receiving oscillator 224. During transmission mode, the transmission oscillator 222 supplies a clock signal to the digital logic components 120. The transmission oscillator 222 preferably operates at approximately 27 megahertz. During receive mode, the receiving oscillator 224 supplies a clock signal to the digital logic components 120. The receiving oscillator 224 preferably operates at approximately 32 kilohertz.

Figure 3:
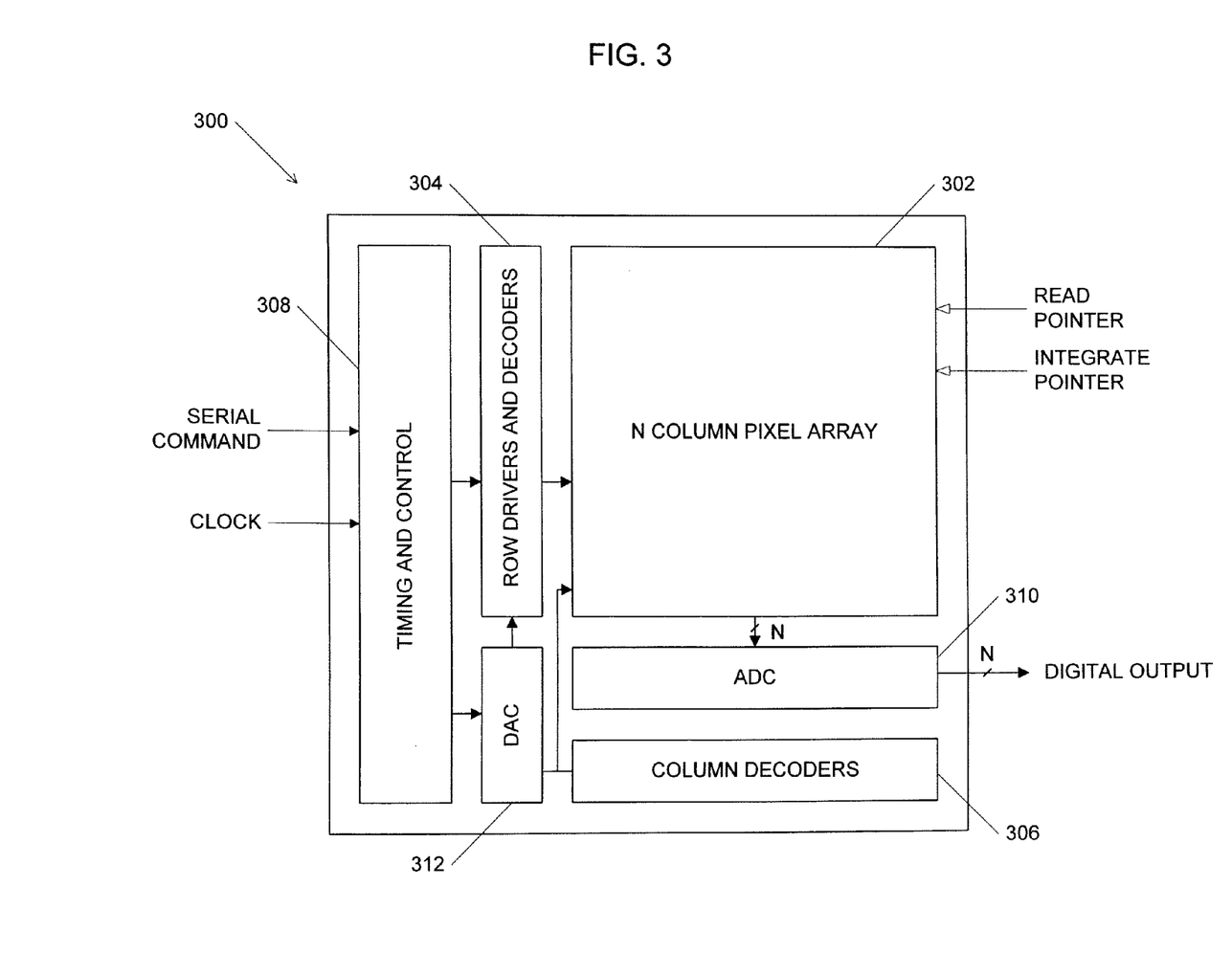
FIG. 3 is a block diagram of an image sensor according to a preferred embodiment.

FIG. 3 illustrates a functional diagram of the components on the imager chip used in a preferred embodiment. The imager chip is preferably a single chip which carries out all these functions. A single integrated circuit with all functionality incorporated therein is used. Thus, external support chips for the imaging chips are not required.

As shown in FIG. 3, the chip 300 includes a pixel array 302. The pixel array 302 comprises an M row by N column series of "active" pixel type photogate pixels, described in further detail with reference to FIG. 5. The photogate pixels are arranged in a matrix of rows and columns, similar to standard pixel arrays in active and passive liquid crystal displays. Control of the pixel array 302 is managed by row drivers and decoders 304 and column decoders 306. These drivers and decoders 304, 306 are used to control individual pixels of the pixel array 302 as well as read data from those pixels in the pixel array 302.

Two pointers are used in the accessing of pixels in the pixel array 302: a read pointer and an integrate pointer. The integrate pointer indicates which row is currently receiving image data. The read pointer indicates which row is available for outputting data from the chip 300. The interval between the integrate pointer and the read pointer sets the integration time for the photogates in the pixels to integrate incoming photons. This time can be changed for different effects, e.g., different resolutions.

The drivers and decoders 304, 306 are controlled through a timing and control block 308. The timing and control block 308 includes clocks and selection circuits. The timing and control block 308 determines which row drivers and decoders 304 and which column decoder 306 are active for either reading or writing from the pixel array 302.

When reading data from the pixel array 302, data is received as an analog signal and converted to a digital signal by an array of analog to digital converters ("ADC") 310 to form a digital signal. That digital signal is output.

The timing and control block 308 generates digital timing and control signals to control the pixel array 302 and the ADC array 310. The timing and control block 308 also generates analog references to operate the pixel array 302 and the ADC array 310. A set of digital to analog converters ("DAC") 312 adjusts these analog signal as appropriate. Command signals received by the chip 300 are preferably received as serial commands through a serial command input.

The timing and control circuitry 308 is used in addition to control power to the various parts of the chip 300. For example, during idle mode or standby mode, power is not supplied to the DAC 312. This selective power distribution within the chip 300 allows for a reduction in overall power consumption of the chip 300 and in turn the entire camera system.

The pointers and serial command allow windowing, subsampling and programmable exposure commands. These commands can be used to edit the received image signal from the pixel array 300 to achieve various effects. The windowing command allows a portion of the overall image to be received. This partial image is commanded via the serial command, to select a beginning point and end point. This allows a section of the pixel array 302 to be used. Doing so may reduce the power consumption of the device as well as avoid the unnecessary imaging of uninteresting portions of the possible image.

A windowing effect may be achieved by driving a subset of the columns and rows. For example, if the pixel array included 10 rows and 10 columns, a window may be created by driving only the first five rows and first five columns. By not driving the remaining columns and rows, less energy is consumed by the chip 300 than when the chip 300 drives all the columns and rows.

Subsampling can be used to provide an overall smaller produced image through the use of a reduced set of the available pixels and the pixel array 302. For example, if only half of the columns in an interspersed fashion are used, the overall width of the image is reduced in half. Taking alternate rows and columns reduces the image resolution by one-fourth. It could also be desirable to reduce the number of rows being used to maintain a proportional image to the original image perceived. The reduction in overall size of the generated image allows for a smaller sized image with lower detail. The number of pixels being driven in this example is one fourth of the total number of pixels in the pixel array 302 (i.e., half of the columns and half of the rows). Thus, the total amount of pixel data may be reduced which reduces the data size of the image. However, the pixels in the pixel array 302 which are not driven do not provide information and so information of the sub-sampled image may be lost compared to the full image.

Programmable exposure allows for the control of brightness and contrast through digital commands. This allows for the camera to operate properly or desirably in non-ideal light conditions. The programmable exposure is implemented by changing the digital exposure control signals to the pixel array 302. These exposure control signals directly determine the amount of time that pixels of the pixel array 302 integrate. For example, for low light conditions longer periods of integration produce superior results. By changing the amount of time between integration, this technique is referred to as a "rolling electronic shutter."

In conventional imaging systems which receive digital commands, the imaging chip does not necessarily include means to transform those digital commands into analog signals. Hence, often both digital and analog control signals are required. The analog control signals are used for various purposes, including as references for the A to D converters.

The imaging chip 300, by contrast, provides digital to analog converters 312 allowing digital command signals to be received and input to the chip 300. The DAC 312 converts the digital signals to analog signals. Thus, the pixel array 302 and the ADC array 310 can receive analog references for proper operation at a pixel level while the chip 300 receives digital signals at a command level.

Other features of the chip 300 provided through the timing and control block 308, ADC 310, and DAC 312 include support for digital stills as well as continuous imaging. The chip 300 may be programmed to supply or take a digital still or a series of images. The chip 300 includes 256 10-bit successive approximation analog digital converters with built-in correlated double sampling ("CDS") and fixed pattern noise ("FPN") suppression. The chip 300 may also provide programmable exposure time implemented as a rolling shutter (approximately 50 microseconds as a minimum; approximately 15 seconds as a maximum). The chip 300 may also be programmed to support a variety of data rates and interfaces (e.g., over four mega-pixels per second at over 60 frames per second, at a maximum).

The power consumption of the APS is approximately 20 mw (at 225 kilo-pixels per second) during imaging digitization and read out mode. Power consumption is approximately 10 mw during imaging mode, and approximately 40 μW during idle power mode. The preferred embodiment allows multiple modes of operation to adjust the power consumption as appropriate.

Figure 4A:
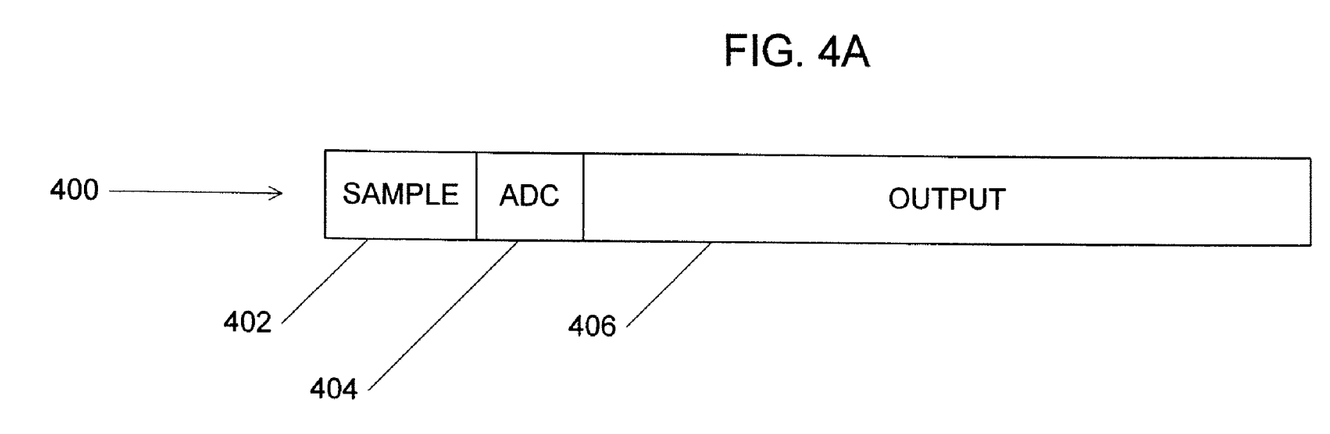
FIG. 4A illustrates time requirements during serial output according to a preferred embodiment.
Figure 4B:
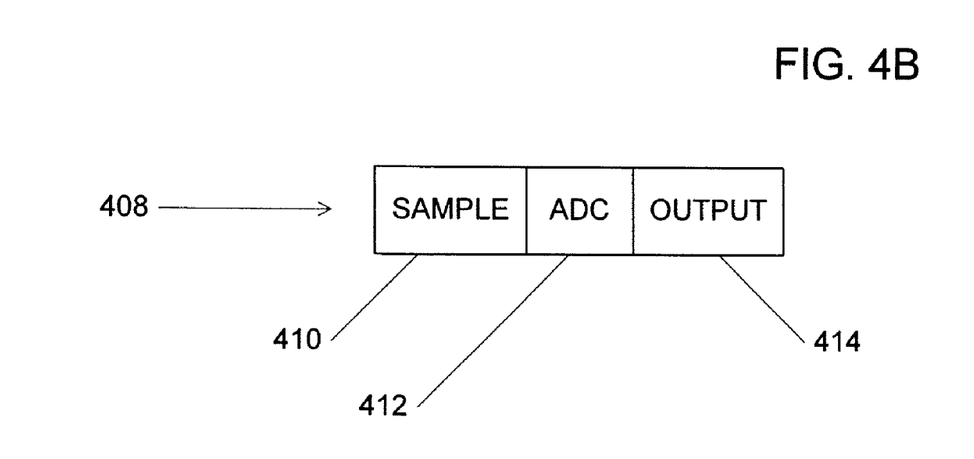
FIG. 4B illustrates time requirements during parallel output according to an embodiment.

FIGS. 4A and 4B illustrate the time requirements for row operations during image readout from the imaging chip of a preferred embodiment. FIG. 4A illustrates the flow of operations when output is serial. For serial output, the output rate is preferably approximately 225 kilo-pixels per second. As shown in FIG. 4A, the serial output time 400 is divided into three overall sections. The sample time 402 requires approximately 88 microseconds. The analog digital conversion time 404 requires approximately 48 microseconds. The serial output time 406 requires approximately 1024 microseconds. 1024 microseconds are required for serial output because there are 256 columns in a preferred pixel array as show in FIG. 3. Approximately 4 microseconds are required to output each pixel contained within that row. Accordingly, 256 columns contained in each row results in 256 times 4 microseconds for a total of 1024 microseconds for serial output.

FIG. 4B illustrates parallel output time requirements. Support for parallel output in the camera is optional. The total parallel output time 408 contains the same general parts as the serial output times 400 shown in FIG. 4A. A sample 410 is 22 microseconds long. The time for ADC 412 is 12 microseconds long. These times are the same length as in the serial output times shown in FIG. 4A. The serial or parallel nature of the output does not change the sample time and ADC time required for data output. However, in parallel output, the parallel output time 414 is only 25.6 microseconds. This reduction in time results from 10 bits being output in parallel. As a result, rather than 256 bits being output one at a time, 256 bits are output 10 at a time. This results in a reduction by a factor of ten in the output time for the parallel output, 25.6 micro seconds. Similar increases in parallel output produce similar reductions in output time.

Figure 5:
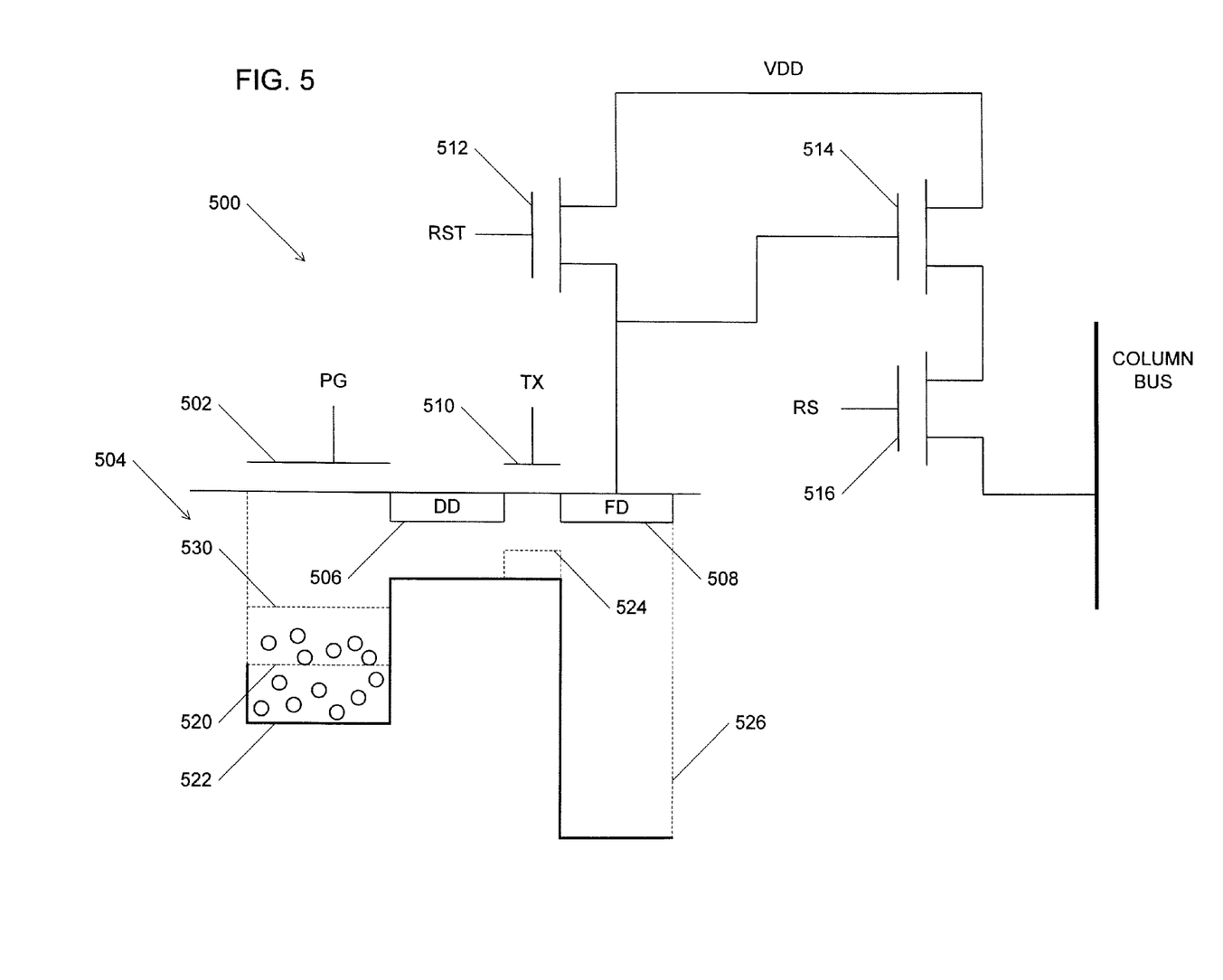
FIG. 5 shows an APS photogate pixel according to a preferred embodiment.

FIG. 5 illustrates a preferred APS photogate pixel included in the pixel array 302 shown in FIG. 3. Each APS photogate pixel 500 includes a photogate covered by an electrode 502. The photogate pixel 500 shown in FIG. 5 is a preferred embodiment of the photogate pixel used in the imaging chip. The camera, however, also includes embodiments within U.S. Pat. No. 5,471,515 to Fossum, et al., the disclosure of which is included herein by reference as well as the associated methods and techniques therein.

The APS photogate pixel 500 includes a photogate electrode 502 over a substrate 504. A drain diffusion 506 and a floating diffusion 508 are within the substrate 504. A transfer electrode 510 bridges the drain diffusion 506 and the floating diffusion 508. A reset field effect transistor ("FET") 512 is connected to the floating diffusion 508 at the source side. The drain of the reset FET 512 is connected to a voltage potential of VDD.

A gate electrode of a source follower FET 514 is connected to the source of the reset FET 512. The drain of the source follower FET 514 is connected to a voltage potential VDD. The source of the source follower FET 514 is connected to the drain of a row select FET 516. The source of the row select FET 516 is connected to a column bus 518.

The gate of the reset FET 512 is controlled by a reset signal RST. The gate of the row select FET 516 is controlled by a row select signal RS. The photogate electrode 502 is controlled by a photogate control signal PG. The transfer electrode 510 is controlled by an analog reference TX.

During an integration period, the photogate electrode 502 is held by the signal PG to a positive voltage to form a potential well 520 in the substrate 504. In this potential well 520, a photo-generated charge is accumulated as illustrated. The transfer electrode 510 is held at a less positive voltage than that of the photogate electrode 502 to form a first potential barrier 524 in the substrate 504 below the transfer electrode 510. Second and third potential wells 522, 526 are located below the drain diffusion 506 and the floating diffusion 508, respectively. To read out a pixel, the voltage of the signal PG is changed from VDD to ground so that the potential well 520 located under the photogate electrode 502 collapses.

The altering of the potential barrier 520 creates a downward potential staircase from the first potential well 520 through the second and third potential wells 522 and 526. This staircase accomplishes a transfer of charge from the potential well 520, where charges accumulate during the integration period, to the third potential well 526 below the floating diffusion 508.

The floating diffusion 508 causes the gate electrode of the source follower FET 514 to become activated in response to the level of charge and potential accumulated in that floating diffusion 508. As a result, the image signal captured by the pixel is transferred to the column bus in response to the select signals to the row select FET 516.

The process and structure described above is one used in a preferred embodiment of an APS photogate pixel. As noted above, the process and components described in U.S. Pat. No. 5,471,515 may be used. Alternatively, other methods accomplishing the same goal of an APS photogate pixel as apparent to those of ordinary skill in the art may be used.

Figure 6:
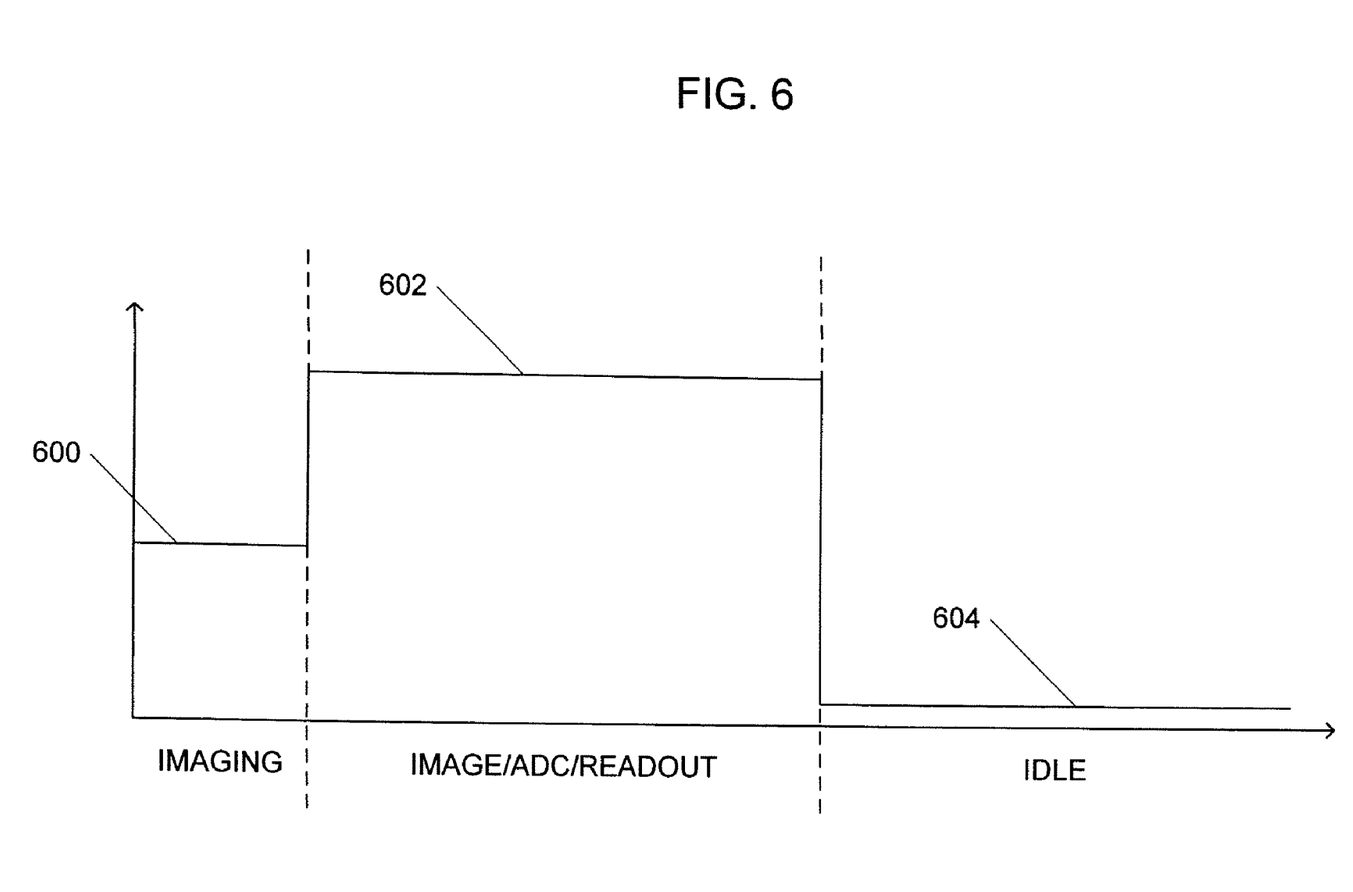
FIG. 6 illustrates power consumption by an APS during various operation modes according to a preferred embodiment.

FIG. 6 illustrates an example of power consumption by a preferred APS during imaging operations. FIG. 6 shows three levels 600, 602, 604 of power consumption. During imaging operations, approximately 11.1 mw are consumed, indicated by the level 600. In the more complicated operations during imaging, ADC, and readouts, approximately 20.1 mw are consumed over a period of 0.3 seconds. This consumption is represented by level 602 of FIG. 6. The operational requirements included in full power transmit mode are approximately 0.992 seconds, including 0.422 seconds for image readout and 0.5 seconds for commands, to transmit each image at a data rate of 2.455 megabits per second. Full power transmit mode preferably generates 16,000 full revolutions snap shots. During low power idle mode, only approximately 600 microwatts are consumed by the camera. The power consumption of this low power mode in the APS is represented by level 604.

The varying levels of power consumption illustrated in FIG. 6 demonstrate the versatility and improved power consumption provided by the preferred embodiment. As compared to conventional imagers and cameras, the operable life span of the imager is improved due to the multiple possible power levels. As discussed above, conventional imaging systems, such as those using CCD image sensors and those which are not programmable with multiple modes of operation, typically operate at one constant power level, which in this case would be equivalent to the maximum power level 602 of 20.1 mw shown in FIG. 6. The preferred embodiment allows an idle mode and an imaging only mode which will not consume power by components which are not in use during these modes.

The battery (recall battery 112 in FIG. 1B and FIG. 2) preferably has an extended life due to the multiple operational modes described above. If maintained in standby or sleep mode, with a brief operation in receive mode approximately once every minute, the preferred battery should last for approximately 200 days. In full power transmit mode, the preferred battery should operate for approximately 5.0 hours.

For example, using the programmable nature of the preferred APS, the APS may be set to sub-sample at approximately 64 by 64 pixels instead of the standard 256 by 256 pixels, as described above, and to turn on the receiver once every 512 seconds (i.e., a sleep time of 512 seconds). Such reductions by sub-sampling reduce the transmit time for a frame by about 40%. This reduction in transmit time per frame reduces the amount of power consumed during transmission and the increased sleep time reduces the power consumed in receiving. Hence the battery life increases. Thus, at these settings, the battery life time may be extended to approximately 190 days.

Figure 7:
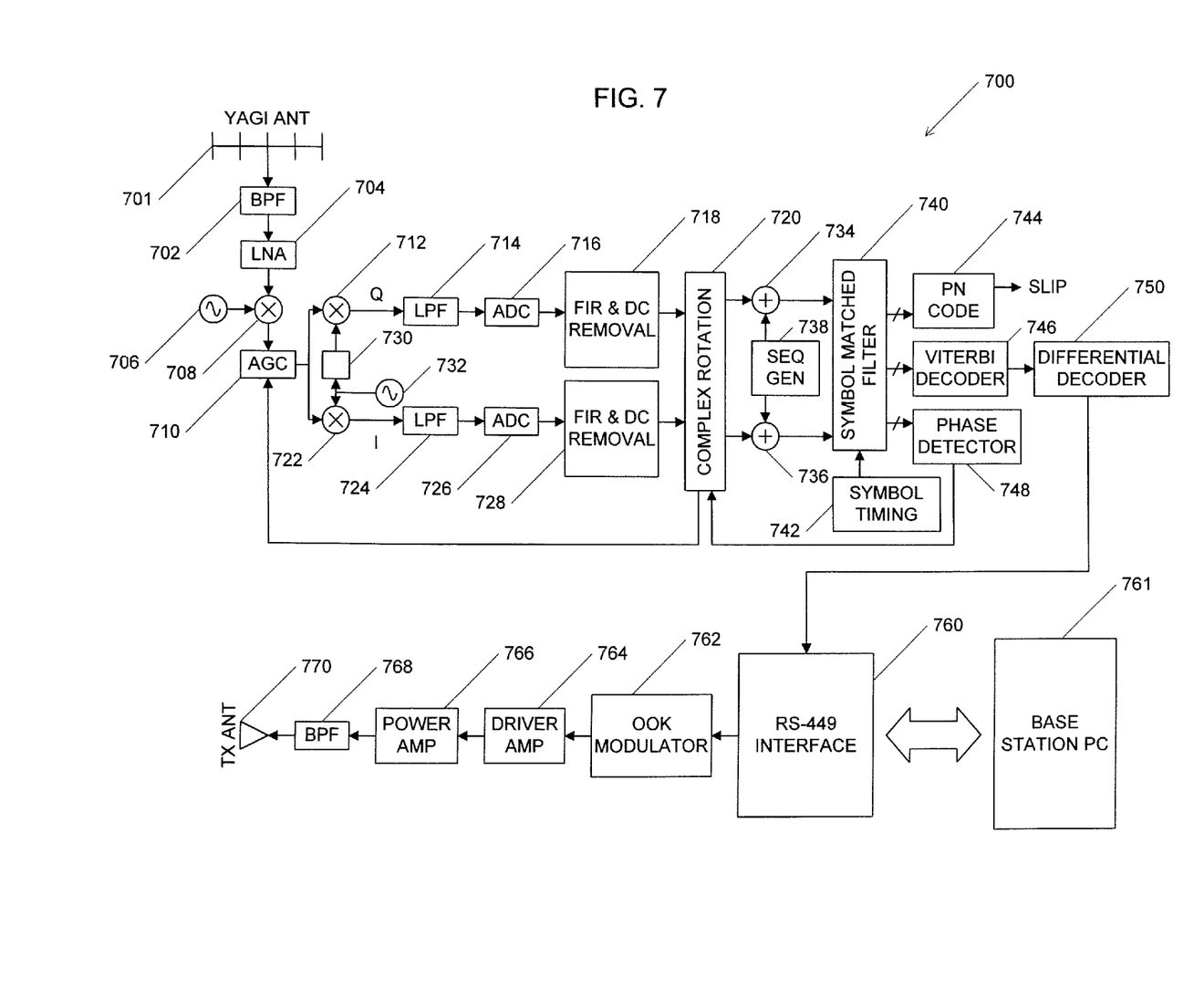
FIG. 7 is a block diagram of a base station according to a preferred embodiment.

As discussed above, the camera preferably transmits image data to and receives command signals from a base station. One embodiment of such a base station is illustrated in FIG. 7.

Image transmitted to the base station 700 is received by a receiving antenna 701. The receiving antenna 701 is preferably a Yagi type antenna with a gain of 16 dB and operates at 2.4 GHz. The signal from the receiving antenna 701 is passed to a receiving band pass filter ("BPF") 702. The receiving BPF 702 filters the signal and sends that filtered signal to a low noise amplifier ("LNA") 704. The LNA 704 amplifies the signal and passes that signal to a first multiplier 708 which converts the signal using generator 706 which preferably generates a signal which is at 2.2416 GHz. The down-converted 70 megahertz signal is passed to an automatic gain control ("AGC") 710.

The AGC 710 passes the signal to both of a second signal multiplier 712 and a third signal multiplier 722 which each down-convert the signal to quadrature baseband signals. A second analog signal generator 732 generates a 70 megahertz signal which is sent to the third signal multiplier 722 and a phase shifter 730. The phase shifter 730 shifts the phase of its received signal by 90 degrees. The down-converted signals are low pass filtered ("LPF") by LPF 714 and LPF 724, then analog to digital converted ("ADC") by ADC 716 and ADC 726, finite impulse response ("FIR") filtered at 718 and 728 and direct current ("DC") shifted. The filtered signals are sent to a complex rotation circuit 720.

The complex rotation circuit 720 receives the two signals from the FIR and DC removal filters 718, 728 and rotates those combined signals. The complex rotation circuit 720 sends a signal to the AGC 710. This signal functions to provide loop feedback functionality to the signal processing of the base station 700. The complex rotation circuit 720 outputs signals in parallel to a first signal adder 734 and a second signal adder 736. A sequence generator 738 generates two signals and sends one to each of the first signal adder 734 and second signal adder 736, respectively.

The first signal adder 734 adds the signals received from the complex rotation circuit 720 and the sequence generator 738. That summed signal is supplied to a symbol matched filter 740. Similarly, the second signal adder 736 adds the received signals from the complex rotation circuit 720 and the sequence generator 738 and sends that summed signal to the symbol matched filter 740.

A symbol timing recovery circuit 742 generates a timing signal which is sent to the symbol matched filter 740. The symbol matched filter 740 outputs a parallel signal to a PN code acquisition/tracking circuit 744, and a Viterbi decoder 746, and a phase detector 748. The code acquisition/tracking circuit 744 adjusts the PN sequence (from the sequence generator 738) to acquire and maintain PN-code lock. The phase detector 748 detects and removes received phase error using the complex rotation circuit 720. The phase detector 748 determines the degree or amount of improper phase in the received signal and sends the signal to the complex rotation circuit 720 to achieve phase lock. The complex rotation circuit 720 may then again rotate the received signal to be passed on to the first and second signal adder 734 and 736.

Once PN-code lock and phase lock have been achieved, the Viterbi decoder 746 decodes the signal and passes the decoded signal to a differential decoder 750. The differential decoder 750 performs additional decoding operations upon the received signal and passes that decoded signal to an RS-449 interface circuit 760.

The RS-449 interface circuit 760 transmits and receives data from a base station computer 761. The RS-449 interface circuit 760 sends a data signal and a clock signal to the base station computer 761. The base station computer 761 preferably has a user interface such as that of Labview™. The base station computer 761 includes a received command interpreter and a control command generation circuit. A Manchester encoding circuit and a transmit packet processor including a generation circuit and repetition logic are used to generate data and command signals to be transmitted by the base station to the receiving antenna of the camera (recall receiving antenna 106 of FIGS. 1A to 2). The transmit packet processor in the base station computer 761 is used to generate data sequences including training sequences, UW data, addresses, and CRC signals. These sequences are used in the internal logic 120 of FIG. 2 after being received by the camera. Accordingly, the base station computer 761 transmits a data signal and a clock signal to the RS-449 interface 760.

The RS-449 interface circuit 760 sends a transmit data signal to an OOK modulator 762. The OOK modulator 762 modulates the received transmission data and sends that modulated signal to a driver amplifier 764. The driver amplifier 764 amplifies the received signal and sends that amplified signal to a power amplifier 766. The power amplifier 766 amplifies the power of the received signal, preferably to approximately 5 watts, and sends that amplified signal to a second BPF 768. The second BPF 768 filters the amplified signal, preferably at approximately 418 megahertz, and sends that filtered signal to a transmitting antenna 770. The transmitting antenna 770 is preferably a YAGI antenna with a gain of approximately 12.3 dB.

Additional variations and implementations are apparent to those of ordinary skill in the art. For example, the camera need not be mobile, but may be fixed in place, such as by mounting into a larger structure or device. The base station may be implemented as a software application within a computer system. In addition, a portion of the base station can be implemented differently so long as a signal supplied to the RS-449 interface allows the RS-449 interface to operate as described above. Accordingly, the invention is not limited by the embodiments described above, but only by the scope of the following claims.

What is claimed is:

1. A single-chip wireless camera comprising;
    a receiving element to wirelessly receive external command signals from a remote device, wherein the external command signals comprise:
        a command to switch between multiple modes of operations comprising an operating state, a receiving state and a sleep state, and
        a programmable command to program said camera to perform one or more imaging operations corresponding to the modes of operations;
    an active pixel sensor having a plurality of addressable units, each said unit associated with a pixel processing element;
    active pixel sensor control circuitry, including circuiting that addresses and controls reading operation of the active pixel sensor;
    a power management element to support the operating state in which circuitry of the chip is powered, the receiving state in which the receiving element is powered once within a duration of time, and the sleep state in which most circuitry is unpowered; and
    a programmable control logic coupled to the receiving element and the active pixel sensor, operating to respond to the received command signals and to control an amount of battery consumption used by said camera by performing the following:
        responsive to the received command to switch between the multiple modes of operation, switching between the operating state, the receiving state and the sleep state to allocate power among components of said camera including the receiving element and the active pixel sensor, and
        responsive to the received programmable command, editing an image signal received from the active pixel sensor by performing the one or more imaging operations selected from a group consisting of:
            subsampling said active pixel sensor, the subsampling comprising powering fewer than all of the plurality of addressable units to receive an entirety of an overall image in a reduced resolution,
            windowing said active pixel sensor to receive a subset of the overall image by powering only a corresponding subset of the active pixel sensor, and
            altering an exposure time to control brightness and contrast of the entirety or the subset of the overall image.

2. The camera of claim 1 further comprising a transmitter.

3. The wireless camera system of claim 1 where the command signals are digital signals and the active pixel sensor circuitry logic converts at least one of the digital command signals to an analog signal to operate the active pixel sensor.

4. The wireless camera system of claim 1 where the camera consumes less power while in the sleep state than while operating in the operating state and the receiving state, and
    where the camera consumes less power while operating in the receiving state than while operating in the operating state.

5. The single-chip wireless camera of claim 1, wherein the plurality of addressable units in the active pixel sensor are arranged in an array of rows and columns, wherein powering fewer than all of the plurality of addressable units comprises powering fewer than all of the addressable units in each row and in each column.

6. The single-chip wireless camera of claim 5, wherein powering fewer than all of the plurality of addressable units in each row and in each column comprises powering alternate addressable units in each row and in each column.

7. The single-chip wireless camera of claim 1, wherein the programmable control logic comprises circuits for performing different functions based on the modes of operations of the camera.

8. The single-chip wireless camera of claim 1, wherein the programmable control logic comprises circuitry to capture still images and continuous images.

9. A camera comprising:
    a casing;
    a lens mounted in the casing;
    an electrical connection for a battery, inside the casing;
    a transmitting antenna mounted on the casing;
    a receiving antenna mounted on the casing;
    a receiver to wirelessly receive external command signals, wherein the external command signals comprise:
        a command to switch between multiple modes of operations comprising an operating state, a receiving state and a sleep state, and
        a programmable command to program said camera to perform one or more imaging operations corresponding to the modes of operations;
    an active pixel sensor having a plurality of addressable units, each said unit associated with a photogate-type photosensitive element, inside the casing, optically coupled to the lens and electrically coupled to the battery;
    a power management element to support the operating state in which circuitry of the chip is powered, the receiving state in which the receiving element is powered once within a duration of time, and the sleep state in which most circuitry is unpowered; and
    a programmable control logic inside the casing and coupled to the transmitting antenna, the receiving antenna, the active pixel sensor, and the electrical connection, said programmable control logic, to respond to the received command signals and to control operation of the camera and an amount of battery consumption used by the camera by performing the following:
        responsive to the received command to switch between the multiple modes of operation, switching between the operating state, the receiving state and the sleep state to allocate power among components of said camera including the receiving element and the active pixel sensor, and
        responsive to the received programmable command, editing an image signal received from the active pixel sensor by performing the one or more imaging operations selected from a group consisting of:
            subsampling said active pixel sensor, the subsampling comprising powering fewer than all of the plurality of addressable units to receive an entirety of an overall image in a reduced resolution, windowing said active pixel sensor to receive a subset of the overall image by powering only a corresponding subset of the active pixel sensor, and altering an exposure time to control brightness and contrast of the entirety or the subset of the overall image based on a given mode of operation.

10. The camera of claim 9 where the active pixel sensor is a single integrated circuit comprising:

a pixel matrix of photogate-type photosensitive elements;

a row driver and decoder coupled to the pixel matrix;

a column decoder coupled to the pixel matrix;

a plurality of analog to digital converters coupled to the pixel matrix and each associated with a unit of the pixel matrix;

at least one digital to analog converter coupled to the pixel matrix; and a control and timing circuit coupled to the row driver and decoder, the column decoder, the analog to digital converter, and the digital to analog converter.

11. The camera of claim 9 where the volume of the camera as a whole is not more than approximately four cubic inches.

12. A wireless camera system including the camera of claim 9 and further comprising a base station, where the base station receives signals transmitted from the camera and transmits the external command signals to be received by the camera.

13. The wireless camera system of claim 12 where the camera consumes less power while in the sleep state than while operating in the operation state and the receiving state, and wherein the camera consumes less power while operating in the receiving state than while operating in the operation state.

14. The wireless camera system of claim 12 where when the camera is in the sleep state, the programmable control logic allocates power so that power is supplied through the electrical connection only to those components of the camera necessary to maintain the idle mode and be able to change to a different mode.

15. The camera of claim 9, wherein the plurality of addressable units in the active pixel sensor are arranged in an array of rows and columns, and wherein powering fewer than all of the plurality of addressable units comprises powering fewer than all of the addressable units in each row and in each column.

16. The camera of claim 15, wherein powering fewer than all of the plurality of addressable units in each row and in each column comprises powering alternate addressable units in each row and in each column.

17. The camera of claim 9, wherein the programmable control logic comprises circuits for performing different functions based on the modes of operations of the camera.

18. The camera of claim 9, wherein the programmable control logic comprises circuitry to capture still images and continuous images.

* * * * *